(12) United States Patent
McCollum

(10) Patent No.: US 8,875,585 B2
(45) Date of Patent: Nov. 4, 2014

(54) APPARATUSES, SYSTEMS, AND METHODS FOR TESTING A MATTRESS

(75) Inventor: Brad McCollum, Pleasant Garden, NC (US)

(73) Assignee: Sealy Technology, LLC, Trinity, NC (US)

(*) Notice: Subject to any disclaimer, the term of this patent is extended or adjusted under 35 U.S.C. 154(b) by 80 days.

(21) Appl. No.: 13/593,821

(22) Filed: Aug. 24, 2012

(65) Prior Publication Data

US 2014/0053653 A1    Feb. 27, 2014

(51) Int. Cl.
    *G01N 3/00* (2006.01)
(52) U.S. Cl.
    USPC .............................................. 73/788; 73/159
(58) Field of Classification Search
    CPC ..... G01L 1/205; G09B 23/30; G01M 99/001; A47C 31/123
    USPC .................... 73/788, 790, 818, 159
    See application file for complete search history.

(56) References Cited

U.S. PATENT DOCUMENTS

| 5,798,703 A * | 8/1998 | Sakai et al. .................. 340/666 |
| 7,036,164 B2 * | 5/2006 | Dickerson ........................ 5/488 |
| 7,520,836 B2 * | 4/2009 | Couvillion et al. ............... 482/8 |
| 7,712,640 B2 * | 5/2010 | Honer et al. .................... 223/66 |
| 8,123,685 B2 * | 2/2012 | Brauers et al. ................ 600/301 |
| 2004/0003669 A1 * | 1/2004 | Gladney et al. .............. 73/865.3 |
| 2008/0078030 A1 * | 4/2008 | Lee et al. .......................... 5/616 |

\* cited by examiner

*Primary Examiner* — Max Noori

(57) ABSTRACT

Apparatuses, systems, or methods for testing a mattress system are described herein. Apparatuses and systems can include a robotic arm assembly and a mannequin to simulate natural human motion or movements that occur during use of a mattress system. The apparatuses and systems described herein can test a mattress system for firmness and/or durability. Also described herein are methods for testing a mattress system with a robotic arm assembly and a mannequin.

19 Claims, 5 Drawing Sheets

APPARATUSES, SYSTEMS, AND METHODS FOR TESTING A MATTRESS

FIELD OF INVENTION

The present invention relates generally to apparatuses, systems, and methods for testing of a mattress system, and more particularly testing of mattress and/or foundation firmness and/or durability.

BACKGROUND

Construction of a mattress and foundation system and the internal components of the system can have different effects upon the performance and feel of a mattress. Metal springs, foam layers, water, air, and other structures have been employed in mattress constructions, both separately or in combination with one another. These different mattress constructions result in a range of product characteristics in a mattress that may be offered to a consumer. Different and new constructions of mattresses, whether through selection of materials, use of new materials, varying thickness of materials, or positioning of materials are continually being utilized in new mattress products.

Both manufacturers and consumers may desire to better characterize or understand the performance and qualities of a particular mattress. Mattresses are not a one-time-use type product and instead may be often used for many years. As a result, the performance of a mattress over its entire life cycle may be of interest.

Some conventional industry testing procedures exist to characterize certain features of a mattress, but such procedures may not fully simulate the typical use of a mattress over the course of its life. Thus, there is a need to provide systems and methods for determining characteristics of a mattress, including firmness and durability.

SUMMARY

Described herein are various embodiments of apparatuses, systems, and methods for testing of a mattress system. In some embodiments, the apparatuses, systems, and methods comprise testing of a mattress system for firmness. In some embodiments, the apparatuses, systems, and methods comprise testing of a mattress system for durability or longevity of its life, and any of the components therein.

In some embodiments described herein, an apparatus for testing a mattress system comprises a robotic arm assembly and a mannequin. The mannequin can be coupled to the robotic arm assembly such that the robotic arm assembly can position the mannequin in a plurality of positions upon the mattress system.

In other embodiments described herein, a system for testing a mattress system comprises a robotic arm assembly, a mannequin, and an operating system. The robotic arm assembly can include an arm and an end-of-arm attachment. The mannequin can be coupled to the end-of-arm attachment. The operating system of the system can direct the movement of the robotic arm assembly and mannequin about the mattress system.

In yet other embodiments, a method of testing a mattress system is described herein. In some embodiments, a method for testing a mattress system comprises applying a force upon a mattress system using a mannequin, sliding the mannequin from a first edge of the mattress system to an inner region of the mattress system, and rotating the mannequin on a surface of the mattress system. In some embodiments, the method can be repeated a plurality of times.

These illustrative aspects and embodiments are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
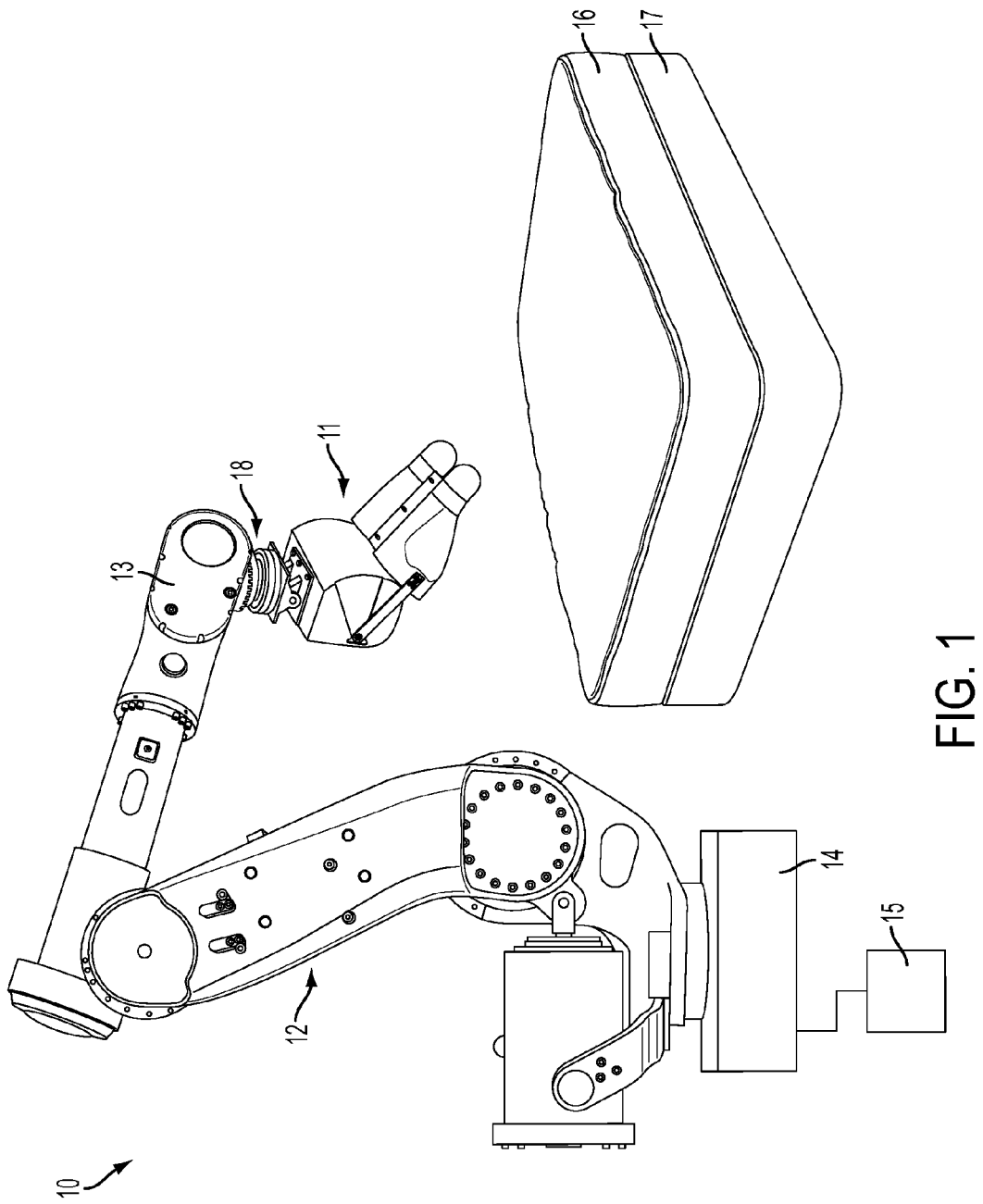
FIG. 1 is a schematic view of an illustrative embodiment of an apparatus for testing a mattress system.

Certain aspects and embodiments described herein relate to apparatuses, systems, or methods that can be used to test a mattress system for firmness and/or durability. The term "mattress system" herein refers to a mattress, a foundation (also known as a box spring), and/or both a mattress and a foundation. As such, apparatuses, systems, or methods described herein relate to apparatuses, systems or methods that can be used to test a mattress only, that can be used to test a foundation only, and/or that can be used to test both a mattress and a foundation. In some embodiments, the apparatuses, systems, or methods can test the mattress system, including but not limited to its external components, internal components, surface firmness and pressures, edge support, foam fatigue, innerspring fatigue, surface material fatigue, foundation fatigue, material relaxation and migration, and/or any other quantifiable measurement which may be interpreted as representative of the product life cycle.

In some embodiments, the apparatuses and systems can simulate human motion or movements upon a mattress surface. Some embodiments of the robotic testing system described herein can direct a mannequin such that specific forces are exerted upon a mattress system that simulate forces exerted on a mattress system by typical human motions or movements during use of the mattress system.

In some embodiments, during the sequence of movements of the mannequin, the robotic testing system can measure different force load responses of the mattress system. In some embodiments, the measured forces can be used to characterize the firmness, durability, surface motion, and/or material migration of a mattress system.

In some embodiments, the robotic testing system can provide information concerning the durability of the mattress system based on simulated human movements. In some embodiments, the robotic testing system can replicate surface fatigue or migration that occurs over the extended use of a mattress system life cycle. In some embodiments, the mattress system can be analyzed upon the completion of a plurality of cycles by inspecting the performance of the components of a mattress system. In some embodiments, the robotic testing system may generate a repeatable, surface impression, or similar visual defect.

In some embodiments, an apparatus for testing a mattress system may comprise a robotic arm assembly and a mannequin. The robotic arm assembly can be operably connected to the mannequin. The robotic arm assembly can be directed to move the mannequin to a plurality of positions upon a mattress by way of different directions and types of movements.

The robotic arm assembly can comprise an arm and an end-of-arm structure configured to be coupled to a mannequin or other attachment. In some embodiments, the arm can have an extension reach such that the arm may reach appropriate regions or sections of conventional industry sized mattresses. In some embodiments, the length of reach and weight distribution or force exerted can vary dependent upon the desired test, size of mattress, or other factors. In some embodiments, the arm can be configured to exert a range of forces simulating those forces applied during human usage of a mattress system. In some illustrative embodiments, the arm can have an extension reach of at least 40 inches from its base. In some illustrative embodiments, the arm can exert up to 1000 pounds of force. In some illustrative embodiments, the arm can be configured to exert a minimum force of 350 pounds at a reach of 40 inches.

The end-of-arm structure of the robotic arm assembly can include an end-of-arm attachment capable of being adjusted in a plurality of directions and along a plurality of axes. In some embodiments, the end-of-arm attachment can be capable of being adjusted along at least six different axes. In some embodiments, the end-of-arm attachment can comprise a multi-axial load cell. In some embodiments, the end-of-arm attachment can be secured to a mannequin such that the mannequin can be positioned in a plurality of positions. The robotic arm assembly can direct the mannequin in a variety of movements including lateral movements, rotational movements, height adjustments, depth adjustments, and other like movements, all at a plurality of angles.

The mannequin may comprise different shapes and structures. In some embodiments, the mannequin can have various forms, such as a partial-body mannequin, a full-body mannequin, or any other shape. In some embodiments, the mannequin may comprise a body portion and leg portions. In other embodiments, the mannequin can simulate a waist region to the knee region of a human body. In some embodiments, a plurality of mannequins may be used.

In some embodiments, the mannequin may comprise at least one sensor. For example, the sensors can include accelerometers, pressure sensors, sensors to measure shear or torsion forces, and/or other like sensors. The sensors may be used to detect or measure movements or exerted forces during movement of the mannequin. Any collected data may be recorded via an operating system or computer. In some embodiments, the mattress system may include similar sensors to detect or measure different movements or forces in a similar fashion.

The weight and size of the mannequin can vary according to the preference and specifications of a testing protocol. In some embodiments, the mannequin can weigh from about 30 pounds to about 500 pounds. In some embodiments, the mannequin can weigh approximately 150 pounds. In some embodiments, the mannequin can be designed to simulate a specific percentile of the human population, for example, the $95^{th}$ percentile.

In some embodiments, the end-of-arm attachment can comprise a multi-axial load cell. The multi-axial load cell can be operably coupled to the mannequin and the robotic arm assembly. In some embodiments, the coupling of the multi-axial load cell includes physical coupling as well as electrically coupling such that information may be transmitted via signals to and from the operating system. In some embodiments, the multi-axial load cell can be adjusted in a direction along at least six axes. In some embodiments, the multi-axial load cell can comprise at least one sensor. In some embodiments, the at least one sensor can measure the load response of force exerted by an end of the robotic arm assembly downward into the surface of a mattress system.

In some embodiments, the apparatus and systems described herein can comprise an operating system. In some embodiments, the operating system can comprise a computer having a processor and memory. The operating system can control and direct the movements of the robotic arm assembly and the mannequin. The operating system can include a processor having programmable code to direct a method or routine for the robotic arm assembly to follow during operation. The operating system can generate a plurality of signals to direct a sequence of movements of the robotic arm assembly.

In some embodiments, during operation of the apparatus and systems described herein, the end-of-arm attachment, for example the multi-axial load cell, can measure different stimuli and feedback generated as the robotic arm assembly is operated. In some embodiments, the stimuli and feedback data can be transmitted to the operating system for collection and storage. In some embodiments, the data can be processed and analyzed to determine different characteristics of the tested mattress system.

In some embodiments, the data provided by the load cell can be analyzed by the operating system such that the movement of the robotic arm assembly can be adjusted or altered automatically depending on the force response of the load cell. In some embodiments, a feedback loop can be utilized to direct the specific movement of the robotic arm assembly. The load cell can use a sensor to measure the output performance of the robotic arm assembly which can then in turn be used to give feedback to the operating system. The operating system may make adjustments or alterations of the movement of the robotic arm assembly to a desired or defined movement.

In some embodiments, the load cell can measure certain stimuli, signals, or data which can then be transmitted or communicated to the operating system. The operating system can comprise a processor and memory such that upon receipt of the data by the operating system, the data can be analyzed in real time. The operating system can then direct the robotic arm assembly to move in a specified manner based upon the analysis of the data by the operating system. In some embodiments, the feedback loop may more closely simulate human movement as a human may adjust or alter her movement dependent upon the feedback from the mattress system.

Referring to the Figures, the numbers used within each figure are consistent with every other figure. When a specific feature is labeled in one figure with a specific numeral, the same numeral will be used in other figures when denoting that specific feature.

FIG. 1 shows a schematic view of one embodiment of a robotic testing system 10 for testing a mattress system. The system 10 includes a robotic arm assembly 12, a mannequin 11, and an operating system 15. The system 10 is shown to test a mattress 16 positioned upon a foundation 17. The robotic arm assembly 12 is comprised of an arm 13 and a multi-axial load cell 18. A base structure 14 for the robotic arm assembly 12 comprises mechanical components, such as gears, motors, electrical components, and other like components, known to one of skill in the art to allow the robotic arm assembly 12 to be operated and moved. The operating system 15 can comprise a computer having programmable code to direct or control the operation of the robotic arm assembly 12. The computer of the operating system 15 can also comprise data acquisition software to collect data obtained via the multi-axial load cell 18. The operating system 15 is operably connected to the robotic arm assembly 12, multi-axial load cell 18, and mannequin 11 to transmit signals and data between the different components for operation, collection, and control of the components.

The multi-axial load cell 18 is operably connected to the mannequin 11. In some embodiments, the multi-axial load cell 18 can comprise at least one sensor that can collect or measure certain stimuli or feedback generated during the operation of the system 10. For example, the multi-axial load cell 18 can include a sensor that collects the load response of a force exerted by the end of the arm 13 downward into the top surface of the mattress 16. The collected data can then be transmitted to the operating system 15.

Figure 2A:
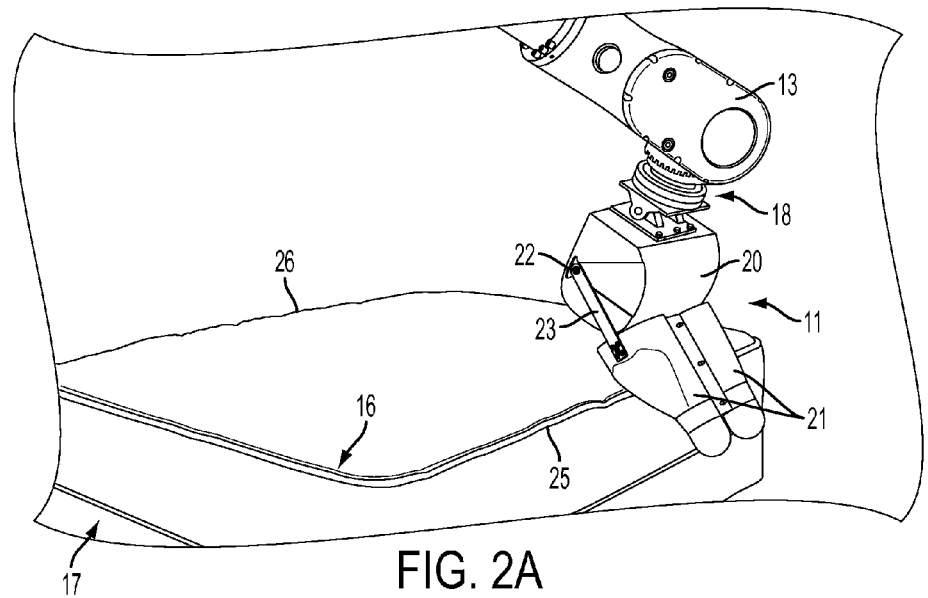
FIG. 2A is a partial side perspective view of an illustrative embodiment of an apparatus for testing system a mattress in a first position.

FIGS. 2A to 2F show illustrative views of the system 10 in use. FIG. 2A shows a portion of the arm 13 and the mannequin 11 in proximity to a mattress 16 in a first position. A multi-axial load cell 18 is positioned between the arm 13 and mannequin 11. The mannequin 11 comprises a body portion 20 and leg portions 21. The leg portions 21 are each operably connected to the body portion 20 via elongated members 23, 23' (23' shown in FIG. 2D) that rotate around pivot points 22, 22' (22' shown in FIG. 2D). The rotation of the leg portions 21 around the pivot points 22, 22' can simulate different relative positions of the leg portions 21 as compared to the body portion 20. For example, when the leg portions 21 are substantially perpendicular to the front face of the body portion 20, the mannequin 11 can simulate a sitting position of a human. On the other hand, when the leg portions 21 are substantially aligned with the front face of the body portion, the mannequin 11 can simulate fully reclined position of a human (when oriented horizontally) or a standing position of a human (when oriented vertically). The mannequin can be directed by the operating system 15 to a plurality of positions ranging between the sitting position and the fully reclined position.

In a first position shown in FIG. 2A, the mannequin 11 is oriented in a position similar to a person intending to sit near a first edge 25 of the mattress 16. The leg portions 21 are angled as compared to the front face of the body portion 20.

Figure 2B:
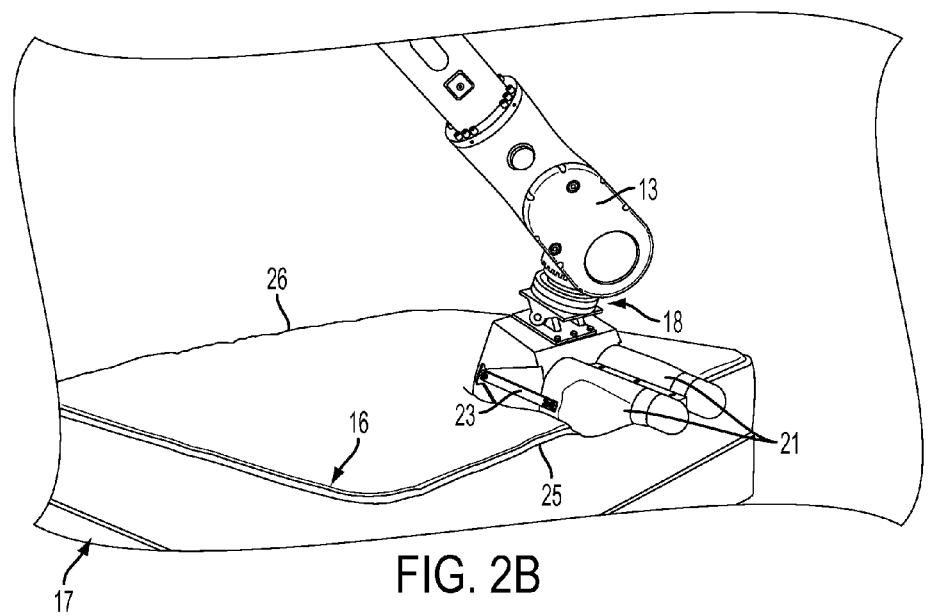
FIG. 2B is a partial side perspective view of an illustrative embodiment of an apparatus for testing a mattress system in a second position.

In a second position shown in FIG. 2B, the mannequin 11 is positioned upon the mattress 16 near the first edge 25 that simulates the sitting position of a human on the mattress. The leg portions 21 rotate around the pivot points 22, 22' providing a second relative angle to the body portion 20. The leg portions 21 of the mannequin 11 are angled in a substantially perpendicular orientation from the front face of the body portion 20 of the mannequin. The leg portions 21 extend over the first edge 25 of the mattress 16 to simulate a sitting position upon the first edge 25. This position may be similar to a human as she first sits upon a mattress prior to fully reclining on the mattress. In some embodiments, the mannequin can supply 200 pounds of force upon the sitting on the edge of the mattress.

Figure 2C:
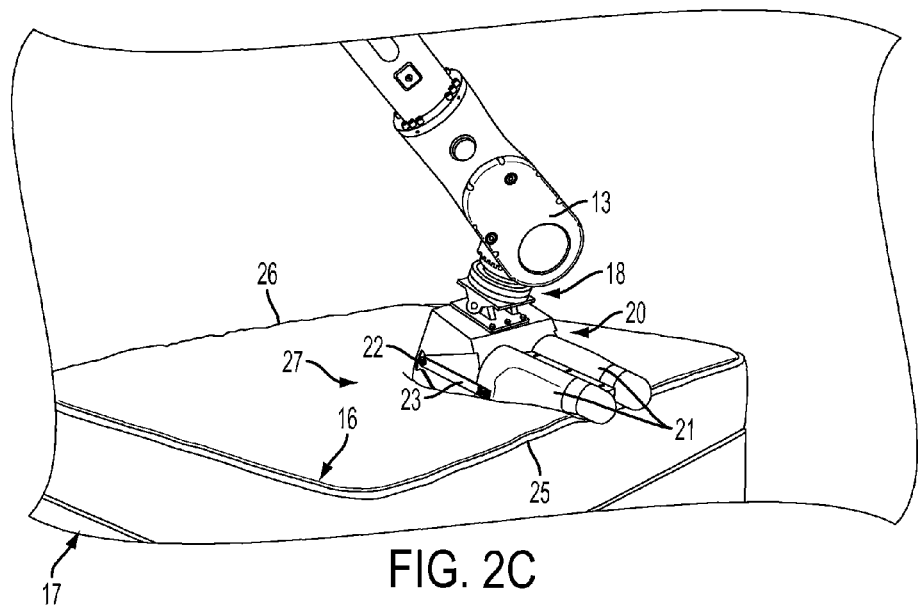
FIG. 2C is a partial side perspective view of an illustrative embodiment of an apparatus for testing a mattress system in a third position.

In a third position shown in FIG. 2C, the mannequin 11 is positioned upon the mattress 16 in proximity to a center or inner region 27. The arm 13 re-positions the mannequin 11 by sliding the mannequin 11 in the direction from the first edge 25 toward the second edge 26 of the mattress 16. The leg portions 21 can remain in the similar relative angle as compared to the body portion 20 as the mannequin 11 moves from the second position shown in FIG. 2B to the third position shown in FIG. 2C.

Figure 2D:
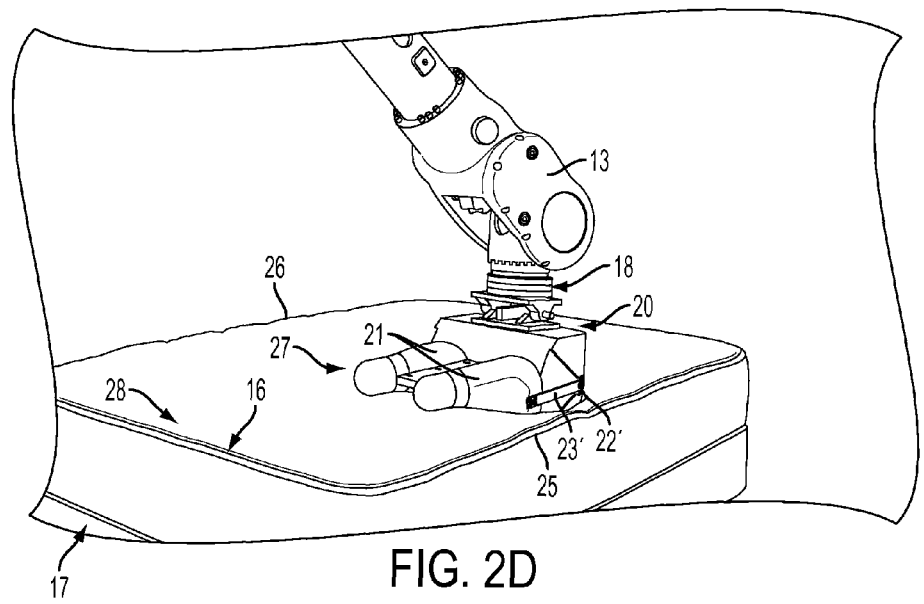
FIG. 2D is a partial side perspective view of an illustrative embodiment of an apparatus for testing a mattress system in a fourth position.

In a fourth position shown in FIG. 2D, the arm 13 and multi-axial load cell 18 rotate the mannequin 11 approximately 90 degrees in a clockwise direction. The leg portions 21 of the mannequin 11 extend in the direction of a foot end 28 of the mattress 16. The movement from the third position shown in FIG. 2C to the fourth position shown in FIG. 2D can simulate a human rotating her body after sitting upon the mattress in preparation to fully recline herself.

Figure 2E:
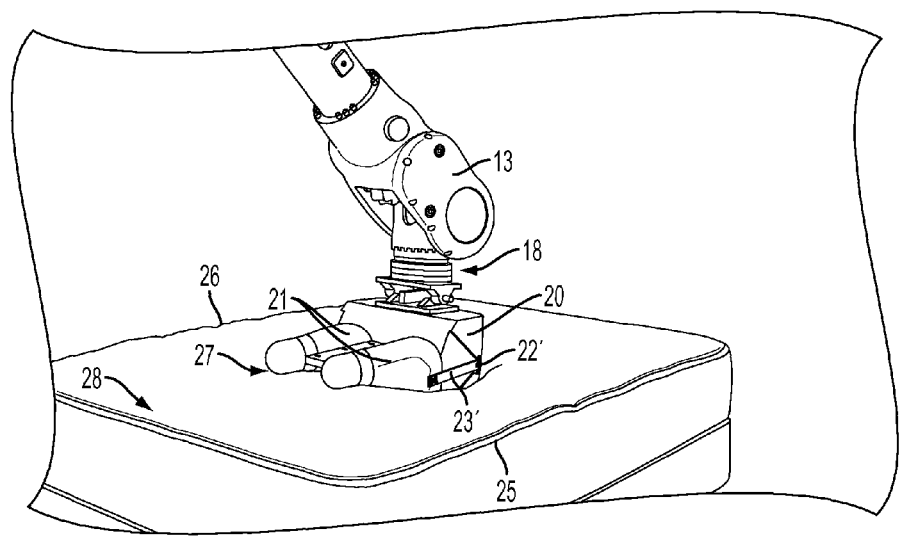
FIG. 2E is a partial side perspective view of an illustrative embodiment of an apparatus for testing a mattress system in a fifth position.

In a fifth position shown in FIG. 2E, the mannequin 11 is shifted to the center region 27 of the mattress in the direction of the second edge 26. The angle of the leg portions 21 to the front face of the body portion 20 of the mannequin 11 remains at substantially the same relative angle during the movement of the mannequin from the fourth position shown in FIG. 2D to the fifth position shown in FIG. 2E. In some embodiments, the mannequin 11 can pivot around the multi-axial load cell 18 to dig into or nestle into the mattress. In some such embodiments, this nestling movement can simulate a human settling into a position prior to reclining herself upon the mattress surface.

Figure 2F:
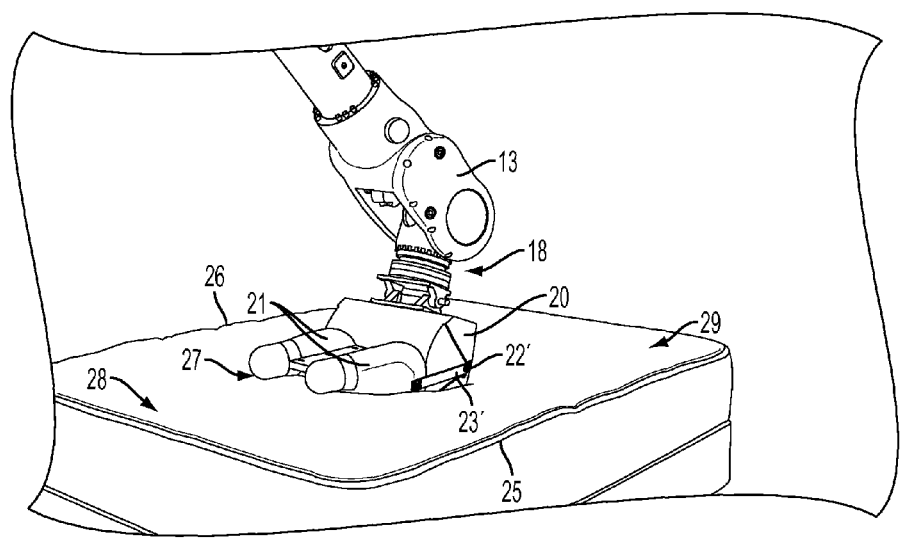
FIG. 2F is a partial side perspective view of an illustrative embodiment of an apparatus for testing a mattress system in a sixth position.

In a sixth position shown in FIG. 2F, the arm 13 and the multi-axial load cell 18 adjusts the position of the mannequin 11 to simulate a reclining position of the mannequin 11. The leg portions 21 rotate around the pivot points 22, 22' such that the relative angle between the leg portions 21 and the front face of the body portion 20 more closely simulate a horizontal reclining position of a human on the mattress 16.

At each position shown in FIGS. 2A to 2F and during the movements between such position, the at least one sensor within the multi-axial load cell 18 and/or mannequin 11 can collect data. The data can then be transmitted via electrical signals to the operating system 14 for collection and analysis. In simulating the sequence of movements a human undertakes when sitting upon a mattress to the reclining position (and subsequently off the mattress), the robotic testing system 10 can measure the different forces and stresses exerted upon the mattress 16 during use. For example, the initial load of the mannequin 11 during the sitting movement can be measured, the directional force applied to the mattress 16 during any sliding or shifting of the mannequin to other positions on the mattress can be measured, and the rotational force and stress applied to the mattress 16 as the mannequin 11 is rotated can be measured as well as forces applied during movements related to the reclining and sitting up of the mannequin 11.

After the mannequin 11 reaches the position shown in FIG. 2F, the sequence of movements shown in FIG. 2A to 2F can be reversed to simulate a human getting up and rising from the surface of the mattress 16. The routine of sitting, shifting, rotating, and reclining, for example as illustrated in FIGS. 2A to 2F, can be repeated a plurality of times to simulate the repeated use of a mattress over the life of the product while collecting data from each step during the routine. In some embodiments, a portion of the movements can be repeated, for example, the sitting and standing motion may be repeated a plurality of times prior to reclining or the change from the reclining position to sitting position may be repeated a plurality of times prior to the standing movement.

In some embodiments, methods for testing a mattress system using the robotic testing system are described herein. In some embodiments, the method can comprise applying a force upon a mattress system via a mannequin, positioning the mannequin in an inner region of the mattress via a sliding movement, and rotating the mannequin on a surface of the mattress system. In some embodiments, the force can be applied upon a first edge of a mattress system. In other embodiments, the force can be applied to other portions of a mattress system, including an inner region. In some embodiments, the robotic arm assembly can apply a substantially constant force upon the mattress system at certain times or with certain movements. In some embodiments, the force can be in a range from approximately 50 to approximately 400 pounds. In other embodiments, the force can be approximately 200 pounds.

In some embodiments, the method can include positioning the mannequin in a second position in the inner region of the mattress system. In some embodiments, the mannequin can be moved via a sliding movement to a plurality of positions. In some embodiments, the mannequin can be positioned in a reclining position to simulate a human reclining on a mattress system in a horizontal orientation.

In some embodiments, the rotating the mannequin on a surface of the mattress step can include rotating the mannequin from a first orientation to a second orientation. In some embodiments, the mannequin can be rotated approximately 90 degrees.

In some embodiments, the movements of the mannequin can be reversed to simulate a person getting up after use of the mattress system. Some such methods can include rotating the mannequin from the second orientation to the first orientation, positioning the mannequin, being in the first orientation, to the first edge of the mattress system, and removing the force from the first edge of the mattress system by lifting the mannequin such that the mannequin does not contact the mattress system.

In some embodiments, the method can comprise holding the mannequin at specific points during the sequence of steps for a defined period of time. For example, after the mannequin has been rotated to the second orientation, the mannequin can remain stationary for approximately twenty seconds, or some other defined period of time.

In some embodiments, the method can be repeated a plurality of times to simulate repeated use of the mattress system by a human.

Some embodiments described herein can be used to measure the firmness of a mattress system, including but not limited to its external components, internal components, surface firmness and pressures, edge support, foam fatigue, innerspring fatigue, surface material fatigue, foundation fatigue, material relaxation and migration, or any other quantifiable measurement which may be interpreted as representative of the product life cycle. Some embodiments described herein can be used to determine the durability of a mattress system, including but not limited to its external components, internal components, surface firmness and pressures, edge support, foam fatigue, innerspring fatigue, surface material fatigue, foundation fatigue, material relaxation and migration, or any other quantifiable measurement which may be interpreted as representative of the product life cycle. The application of a repeated load by way of the robotic arm assembly may provide a more accurate reproduction of the forces applied to a mattress system by a human during usage, as compared to conventional load or impact tests. The robotic testing system can measure the load response of the mattress system as a result of the force extended by the end-of-arm attachment downward on the surface of the mattress system. Such measurements can be used to evaluate the performance of a mattress system over time and any changes in the performance of the mattress system as a result of normal human use.

Figure 3:
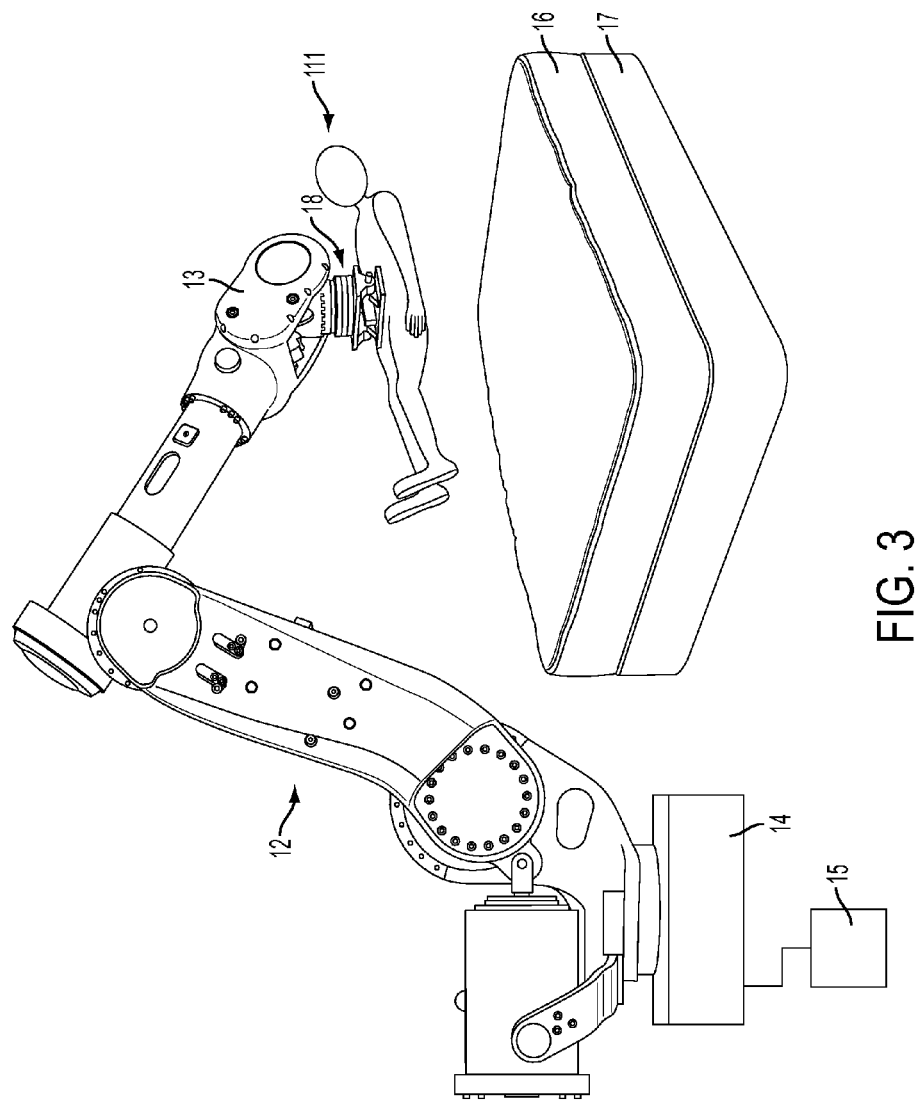
FIG. 3 is a schematic view of an additional illustrative embodiment of an apparatus for testing a mattress system.

FIG. 3 shows yet another embodiment of a robotic testing system 10 comprising a mannequin 111 having a shape of a full human form. The mannequin 111 can comprise a series of structures and wires to direct control of the mannequin 111 into various positions, such as a sitting position or reclining position as well as the rotation of the mannequin. In some such embodiments, the mannequin can mirror the same movements described in the sequence of positions shown in FIG. 2A to 2F. The multi-axial load cell 18 and mannequin 111 can comprise at least one sensor to measure the different stimuli and feedback during operation of the robotic testing system 10. In some embodiments, a plurality of sensors can be employed on the mannequin 111 to measure stimuli at different points on the mannequin 111.

In some embodiments, the robotic testing system can comprise a second mannequin. The second mannequin can be positioned upon a surface of a mattress system in a second region of the mattress system. In some embodiments, the second mannequin can include at least one sensor. In some embodiments, the second mannequin can measure or detect motion transfer or other forces applied upon the second mannequin as a result of movements of the first mannequin attached to a robotic arm assembly. In some embodiments, the second mannequin can be coupled to the robotic arm assembly. In other embodiments, the second mannequin may not be coupled to the robotic arm assembly. The second mannequin can be operably coupled to an operating system that can collect and store data from the second mannequin or its sensors.

The foregoing description of the embodiments, including illustrated embodiments, of the systems and products have been presented for the purpose of illustration and description and is not intended to be exhaustive or to limit the invention to the precise systems or forms disclosed. Numerous modifications, adaptations, and uses thereof will be apparent to those skilled in the art without departing from the scope of the description herein.

What is claimed is:

1. An apparatus for testing a mattress system comprising:
a robotic arm assembly;
a mannequin coupled to the robotic arm assembly; and
a multi-axial load cell operably connected to the mannequin,
wherein the robotic arm assembly is configured to position the mannequin in a plurality of positions upon a mattress system.

2. The apparatus of claim 1, wherein the multi-axial load cell comprises at least one sensor.

3. The apparatus of claim 2, wherein the at least one sensor measures the load response of force exerted by an end of the robotic arm assembly.

4. The apparatus of claim 1, further comprising an operating system, wherein the operating system directs the operation of the robotic arm assembly.

5. The apparatus of claim 4, wherein the operating system directs the operation of the robotic arm assembly in response to force feedback provided by a multi-axial load cell.

6. The apparatus of claim 4, wherein the operating system comprises a computer processor and memory.

7. The apparatus of claim 4, wherein the operating system collects and stores data from the robotic arm assembly or mannequin generated during the testing of a mattress system.

8. The apparatus of claim 1, wherein the mannequin is a partial body mannequin.

9. The apparatus of claim 1, wherein the mannequin is a full body mannequin.

10. A system for testing a mattress system comprising:
a robotic arm assembly comprising an arm and an end-of-arm attachment;
a mannequin coupled to the end-of-arm attachment; and
an operating system, wherein the operating system is configured to direct the movement of the robotic arm assembly and mannequin about a mattress system such that the mannequin at least slides and rotates on the surface of the mattress system.

11. The system of claim 10, wherein the operating system collects and stores data gathered during the movement of the robotic arm assembly.

12. The system of claim 11, wherein the data can be processed to determine the firmness or surface depression of the mattress system.

13. A method for testing a mattress system comprising:
applying a force upon a mattress system using a mannequin;
sliding the mannequin from a first edge of the mattress system to an inner region of the mattress system; and
rotating the mannequin on a surface of the mattress system.

14. The method of claim 13, wherein the force is applied upon the first edge of the mattress system.

15. The method of claim 13 further comprising:
sliding the mannequin to a second position in the inner region of the mattress system.

16. The method of claim 13, wherein rotating the mannequin on a surface of the mattress system comprises rotating the mannequin from a first orientation to a second orientation.

17. The method of claim 13, wherein the rotating the mannequin comprises rotating the mannequin at least 60 degrees.

18. The method of claim 13, wherein the mannequin remains stationary for a specified period of time in at least one position on the mattress system.

19. A method for testing a mattress system comprising:
applying a force upon a mattress system using a mannequin;
sliding the mannequin from a first edge of the mattress system to an inner region of the mattress system;
rotating the mannequin on a surface of the mattress system from a first orientation to a second orientation;
rotating the mannequin from the second orientation to the first orientation;
sliding the mannequin in the first orientation from the inner region of the mattress system to the first edge of the mattress system; and
removing the force upon the first edge of the mattress system by lifting the mannequin such that the mannequin does not contact the mattress system.

* * * * *